United States Patent
Eickemeyer et al.

[11] Patent Number: 5,878,243
[45] Date of Patent: *Mar. 2, 1999

[54] APPARATUS FOR DECREASING THE CYCLE TIMES OF A DATA PROCESSING SYSTEM

[75] Inventors: Richard James Eickemeyer, Rochester, Minn.; Nadeem Malik, Austin, Tex.; Avijit Saha, Austin, Tex.; Charles Gorham Ward, Austin, Tex.

[73] Assignee: International Business Machines Corp., Armonk, N.Y.

[*] Notice: The term of this patent shall not extend beyond the expiration date of Pat. No. 5,652,774.

[21] Appl. No.: 824,224

[22] Filed: Mar. 25, 1997

Related U.S. Application Data

[63] Continuation of Ser. No. 676,747, Jul. 8, 1996, Pat. No. 5,652,774.

[51] Int. Cl.⁶ ............................................. G06F 9/00
[52] U.S. Cl. ................... 395/393; 395/395; 395/800.23
[58] Field of Search ........................... 395/800.23, 393, 395/392, 395, 598, 561, 567

[56] References Cited

U.S. PATENT DOCUMENTS

| | | | |
|---|---|---|---|
| H1291 | 2/1994 | Hinton et al. | 395/800.23 |
| 4,574,349 | 3/1986 | Rechtschaffem | 711/154 |
| 4,811,215 | 3/1989 | Smith | 395/390 |
| 4,888,679 | 12/1989 | Fossum et al. | 395/800.06 |
| 5,390,307 | 2/1995 | Yoshida | 395/566 |
| 5,404,486 | 4/1995 | Frank et al. | 711/128 |
| 5,428,811 | 6/1995 | Hinton et al. | 395/800.23 |
| 5,430,888 | 7/1995 | Witek et al. | 364/243.4 |
| 5,487,156 | 1/1996 | Popescu et al. | 395/393 |
| 5,517,657 | 5/1996 | Rodgers et al. | 711/169 |
| 5,548,776 | 8/1996 | Colwell et al. | 395/393 |
| 5,596,735 | 1/1997 | Hervin et al. | 395/586 |
| 5,627,985 | 5/1997 | Fetterman et al. | 395/393 |
| 5,652,774 | 7/1997 | Eickemeyer et al. | 395/393 |
| 5,664,136 | 9/1997 | Witt et al. | 395/384 |
| 5,668,985 | 9/1997 | Carbine et al. | 395/395 |
| 5,689,720 | 11/1997 | Nguyen et al. | 395/800.23 |
| 5,699,537 | 12/1997 | Sharangpani et al. | 395/393 |

*Primary Examiner*—Zarni Maung
*Attorney, Agent, or Firm*—Richard A. Henkler

[57] ABSTRACT

A method and apparatus for reducing the number of cycles required to implement load instructions in a data processing system having a Central Processing Unit (CPU). The CPU includes a rename register file that can be used in whole or in part for retaining cache lines from previously executed load instructions. The rename register file is then used by subsequent instructions (e.g. load instructions) requiring the data previously loaded therein. Thus, reducing the cycles normally associated with retrieving the data from the cache for the subsequent instructions.

6 Claims, 5 Drawing Sheets

APPARATUS FOR DECREASING THE CYCLE TIMES OF A DATA PROCESSING SYSTEM

CROSS REFERENCE TO RELATED PATENT APPLICATIONS

This application is a continuation of Ser. No. 08/676,747, filed on Jul. 08, 1996 U.S. Pat. No. 5,652,774 issue date Jul. 29, 1997, for "An Improved Method and Apparatus for Increasing Processor Performance", and assigned to the same assignee as the present invention.

BACKGROUND

1. Field of the Present Invention

The present invention relates to data processing systems, and more specifically, to methods and systems that improve the performance of the data processing system.

2. History of Related Art

The exploitation of the computer by businesses as well as the individual user has resulted in an ever increasing demand for better and faster technology related thereto. One such means for increasing the speed and efficiency of the computer system is cache memory. In general, cache memory is a small fast storage memory that is used for accessing the most commonly used data, and is based upon the principle called locality of reference.

Computer systems using cache memory have increased their overall efficiency. However, the retrieval of the information from the cache via load instructions requires at least one pipeline cycle. Further, depending upon the pipeline configuration, the data (datum) may not be available for use by a following instruction until at least another cycle after the previous cache access. Thus, it can be seen from the above that regardless of the pipeline configuration used, at a minimum, one cycle is required in order to be able to access and use the value of a load by subsequent instructions.

Consequently, the execution of both the load and subsequent dependent instruction(s) during the same cycle is not possible. Obviously, this type of restriction can become a performance bottle neck in multiple issue and execute machines, such as superscaler, that attempt to execute several independent instructions within the same cycle via multiple functional units.

The potential for the bottle neck becomes more apparent upon the realization that a program has a typical distribution of instructions on the order of 20% for loads and 50% for subsequent instructions that depend upon the result of the loads (load use interlock). In example thereof, a superscaler machine that can issue and execute two instructions every cycle, i.e. an ideal CPI of 0.5 (with infinite cache), would result in a performance bottle neck via the load serialization of $(0.5+0.2\times0.5\times1)\div0.5=1.2$ times. If the result of the load instruction is not available for use by a subsequent dependent instruction until another cycle, then the bottle neck can be as much as $(0.5+0.2\times0.5\times2)\div0.5=1.4$ times. In other words, the serial execution of load instruction with the subsequent dependent instruction can make the above noted superscaler machine execute between 20 to 40% slower. The above example assumes that no other independent instruction(s) could have been scheduled in place of the interlocked instruction.

Techniques such as code rescheduling have been developed to reduce such bottle necks by 20 to 50%. Even with the use of such techniques, however, the bottle neck is still significant. Specifically, if an extra cycle is needed for a load use interlock, then the delay is on the order of $(0.5+0.2\times 0.2\times2)\div0.5=1.2$ times (20%), or $(0.5+0.2\times0.2\times1)\div0.5=1.1$ times for no interlock.

It would, therefore, be a distinct advantage to have a method and apparatus for reducing the cycle times associated with load use interlock. The present invention provides such an apparatus and method.

SUMMARY OF THE PRESENT INVENTION

In one aspect, the present invention is a data processing system having a communication bus for transmitting data, and input means, coupled to the communication bus, for receiving input from a user. The data processing system further includes display means, coupled to the communication bus, for displaying information to the user, and memory, coupled to the communication bus, for storing data. The data processing system also includes a central processing unit.

The central processing unit having an internal cache for storing data retrieved from the memory, and a register file including a plurality of registers for manipulating data via instructions. The central processing unit further includes a rename register file having a plurality of registers, and an instruction processing unit for processing the instructions. The central processing unit also includes segmenting means for segmenting the rename registers into at least two sets, a first set being used for renaming purposes, and a second set being used for storing previously accessed data from the cache via a load instruction.

In yet another aspect, the present invention is a method of reducing the number of cycles required to implement a load instruction in a data processing system having a central processing unit and a cache. The central processing unit including a rename register file having a plurality of rename registers. The method includes the step of loading, in response to executing a first load instruction, data into the rename register file from the cache. The method further includes the steps of executing a second load instruction having a source register, and determining, during the execution of the second load instruction, that the requested data resides in one of the rename registers. The method also includes the step of substituting the source register with the rename register containing the requested data.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
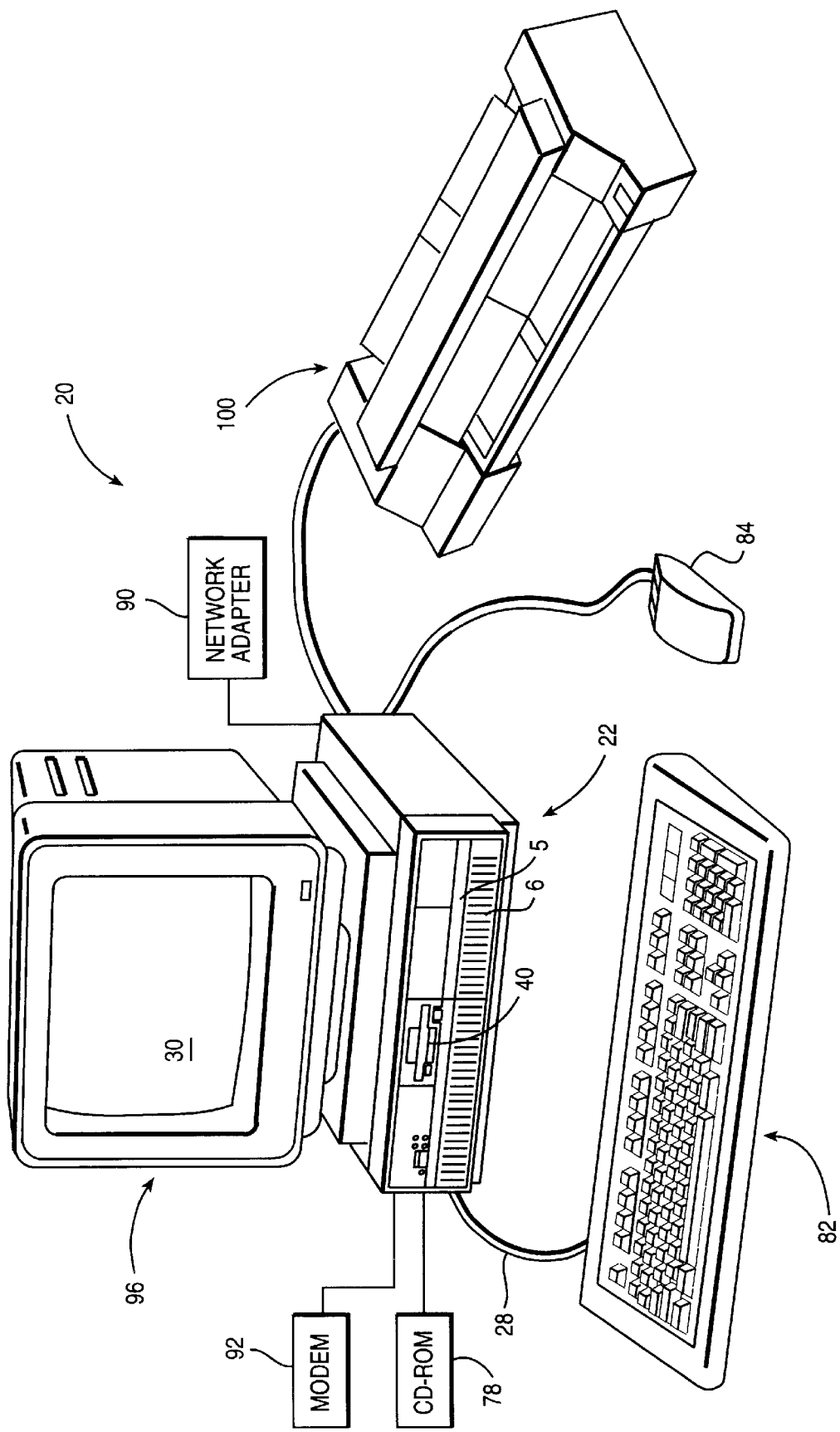
FIG. 1 is a diagram of a data processing system in which the present invention can be implemented.

Reference now being made to FIG. 1, a data processing system 20 is shown in which the present invention can be implemented. The data processing system 20 includes processor 22, keyboard 82, and display 96. Keyboard 82 is coupled to processor 22 by a cable 28. Display 96 includes display screen 30, which may be implemented using a cather ray tube (CRT) a liquid crystal display (LCD) an electrode luminescent panel or the like. The data processing system 20 also includes pointing device 84, which may be implemented using a track ball, a joy stick, touch sensitive tablet or screen, track path or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be readily recognized by those persons of ordinary skill in the art that display 96, keyboard 82, and pointing device 84 may each be implemented using any one of several known off-the-shelf components.

Figure 2:
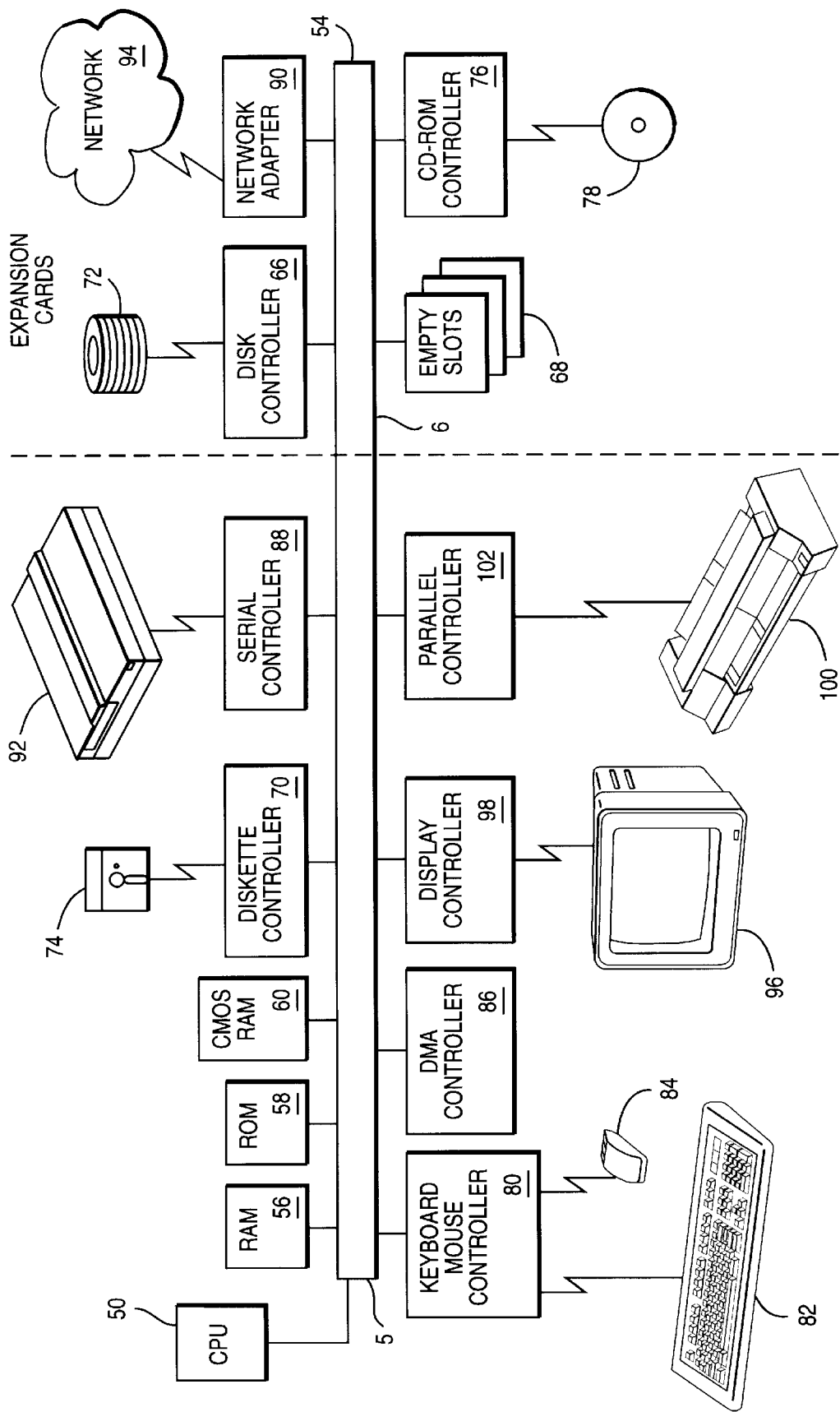
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to communication bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, bubble memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slits. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices or typically used control an on-screen element, such as a cursor, which may take the form of an arrow having an hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to communication bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signal that govern the flow of information). The examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between communication bus 5 and another parallel communication device, such as printer 100.

CPU 50 fetches, decodes, and executes instructions, and transfers information to and from other resources via the computers main data-transfer path, communication bus 5. Such a bus connects the components in a data processing system 20 and defines the medium for data exchange. Communication bus 5 connects together and allows for the exchange of data between memory units 56, 58, and 60, CPU 50, and other devices as shown in FIG. 2.

Figure 3:
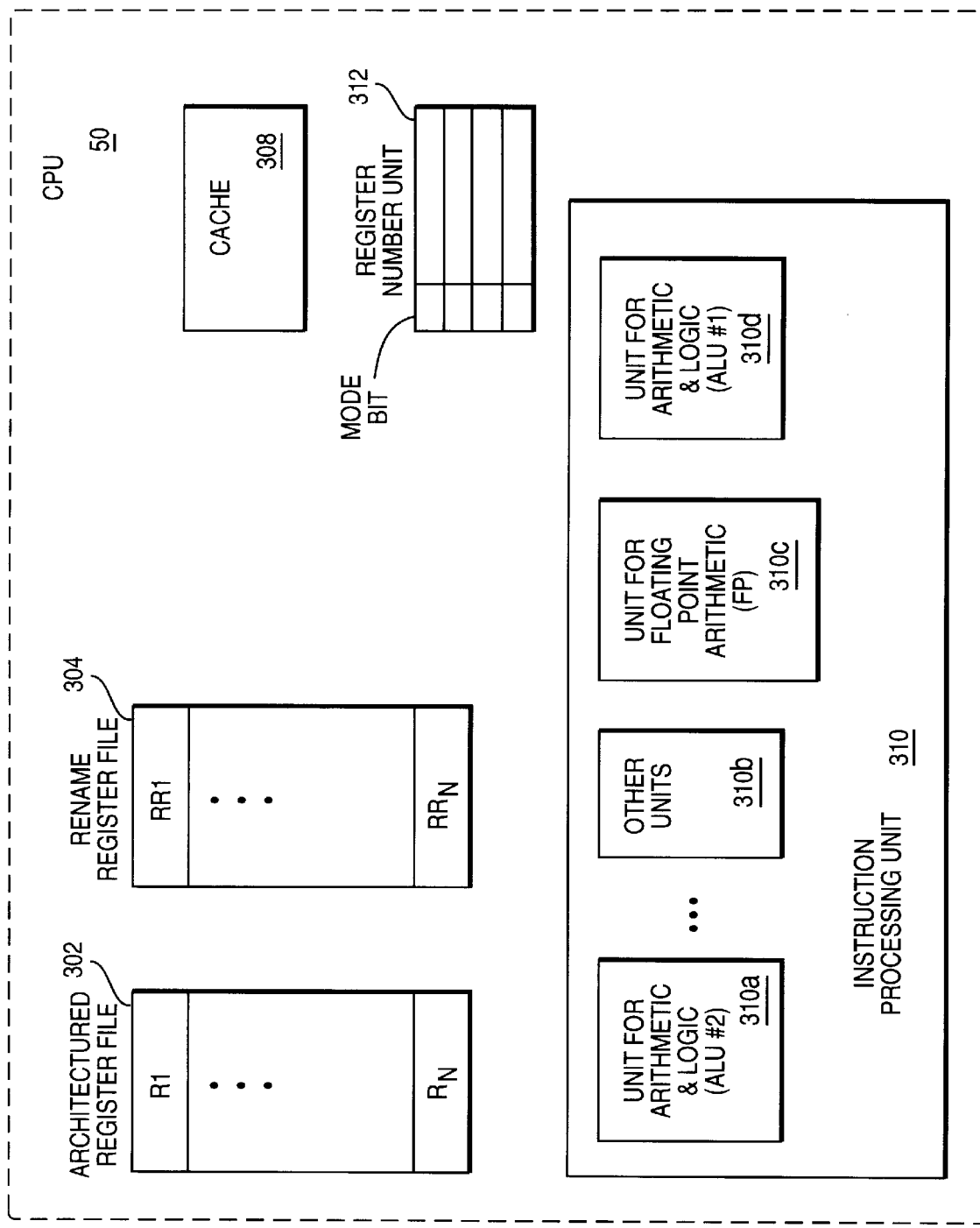
FIG. 3 is a block diagram illustrating in greater detail selected components of the CPU of FIG. 2 according to the teachings of the present invention.

Reference now being made to FIG. 3, a block diagram is shown illustrating in greater detail selected components of the CPU 50 of FIG. 2 according to the teachings of the present invention. The CPU 50 includes an Architectured Register File 302, a Rename Register File 304, an internal Cache 308, and an Instruction Processing Unit 310. In this example, CPU 50 is assumed to be a three-way superscalar processor pipeline. It should be readily recognized by those persons of ordinary skill in the art, however, that the application of the present invention is not intended to be limited to any particular number of ways, or even to a superscalar processor, and is in fact equally applicable to a single issue processor as well. The use and implementation of the Architectured Register File 302, internal Cache 308, and Instruction Processing Unit 310 are well known and understood by those of ordinary skill in the pertinent art. Consequently, only brief descriptions of each are provided below.

The Architectured Register File 302 is used by the CPU 50 for quick and efficient manipulation of data via instructions (e.g. Mov AX,BX).

The Instruction Processing Unit 310 includes a Unit for Arithmetic and Logic (ALU #1) 310a, Other Units 310b, a Unit for Floating Point Arithmetic (FP) 310c, and a unit for Arithmetic and Logic (ALU #1) 310d. The composition of the Instruction Processing Unit 310 allows it to execute multiple instructions per cycle, provided certain qualifications are satisfied (e.g. dependency). Cache 308 is a typical internal cache such as a level zero or one. It should be noted that the present invention is equally applicable to CPUs without internal caches as well.

The Rename Register file (RRF) 304 has typically been used for allowing the CPU 50 to execute instructions in a non-sequential fashion, often referred to as "out of order", via the use of additional registers contained therein. In a preferred embodiment of the present invention, some or all of these registers can be used for eliminating the cycle times associated with subsequent loads of data residing within the same cache line.

More specifically, each time a load instruction is executed, and the corresponding data is retrieved from the cache, the cache line containing the data is loaded into selected (identified) sets of RRF 304 registers. Any subsequent load instructions requesting data residing within the loaded cache line can be replaced with the RRF 306 register containing the data. In essence, a part or whole of the RRF 304 is used as a high speed load cycle-less internal cache (i.e. no processor cycles for the load are required, except for those required for register manipulation).

It should be noted that since the rename registers are mostly used for the "renames" that have to be done for out-of-order load instructions, re-deploying some or all of them to remove the load instructions altogether should not have a negative effect on their absence.

The RRF 304 is organized in a fashion that is consistent with the size of the cache line. In other words, each selected RRF 304 register must contain a particular number of bytes of data, as defined by the system, from the cache line. This results in a predetermined number of RRF 304 registers being associated with the cache line.

In example, assume that the system uses a 32 byte cache line, and a total of 32 RRF 304 registers each being 32 bits in length (4 bytes). In light thereof, if the entire RRF 304 is desired to be used as a load-less cache, then the maximum number of cache lines capable of being contained in the RRF 304 is equal to four (32/8). It should also be noted that, at least in this example, eight RRF 304 registers contain the entire cache line.

The Register Number Unit 312 serves a dual purpose. First, it serves as a means for tracking the base register number of the base register from the load instruction that initially caused the loading of the cache line into the RRF 306 (e.g. load R1, 0(Base Register)), and associating that number with the set of RRF 306 registers containing the cache line. More specifically, the Register Number Unit 312 has a number of entries equal to the total number of cache lines capable of being loaded into the RRF 304.

In continuation of the above example, the Register Number Unit 312 would contain four entries for representing each of the possible four cache lines. Each one of these entries corresponds to the eight RRF 306 registers that can contain the cache line. The segmentation of the RRF 306 is accomplished by assigning a mode bit to each entry.

Consequently, any mode bit that is set, indicates that the set of corresponding RRF 304 registers are being used to contain a cache line of data.

In further elaboration, assume that the sequence of instructions as enumerated in Table I below are being executed in accordance to the previous assumptions (32 byte cache line, 32 bit RRF registers, etc. . . . ).

TABLE I

| Load | R1, | 0 (R4) |
| Add | R2, | R1+R3 |
| Load | R5, | 4 (R4) |
| Or | R3, | R2, R5 |

Further, assume that during the execution of the first load instruction "Load R1, 0(R4)" the cache line containing the data located at 0(R4) was loaded into RRF 304 registers RRF0–RRF7. Consequently, the first entry of the Register Number Unit 312 would contain the value four representing the register number four. During execution of the second load instruction "Load R5, 4(R4), the Register Number Unit 312 would be checked to determine whether a cache line was previously loaded in connection with "R4".

In this case, it is represented by RRF 304 registers RRF0–RRF7. The offset four, representing the fifth byte in the cache line, is used to determine which of the eight RRF 304 registers RRF0–RRF7 contains the necessary data. Since each RRF 304 register, in this example, is capable of only holding four bytes of data, RRF 304 register RRF1 contains the necessary data. This determination can be accomplished by using the binary representation of the offset and recognizing that by shifting the representation to the right by two, the RRF 304 register containing the data is identified.

It should also be noted that the remaining 3 mode bits and their corresponding entries are not being used for load-less caching.

In light of the above, the instruction sequence would be re-written as shown in Table II below.

TABLE II

| Load | R1, | 0 (R4) |
|------|-----|--------|
| Add  | R2, | R1+R3  |
| Or   | R3, | R2, RRF1 |

As noted from the above sequence, once it is determined that the requested data of the subsequent load instruction "Load R5, 4(R4)" resides within the RRF 304, then the subsequent load instruction is eliminated, and the target register replaced with the corresponding RRF 304 register containing the data.

The implementation of the present invention within a pipeline configuration scaler processor is explained in detail below in connection with FIGS. 4 and 5.

Figure 4:
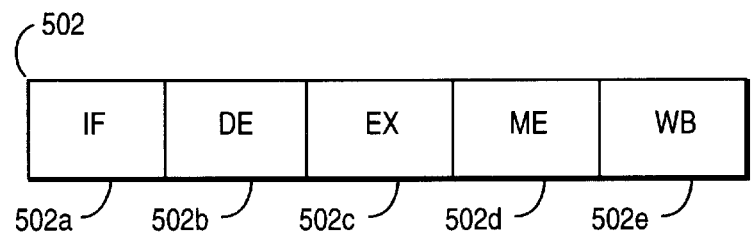
FIG. 4 is a block diagram illustrating the pipeline configuration of a typical scaler processor that includes the Rename Register File of FIG. 3 according to the teachings of the present invention.

Reference now being made to FIG. 4, a block diagram is shown illustrating the pipeline configuration 502 of a typical scaler processor that includes the Rename Register File 304 of FIG. 3 according to the teachings of the present invention. The pipeline configuration 502 includes the following stages: (1) Instruction Fetch (IF) 502a; (2) Decode 502b; (3) Execute 502c; (4) Memory 502d; and (5) WriteBack 502e.

Figure 5:
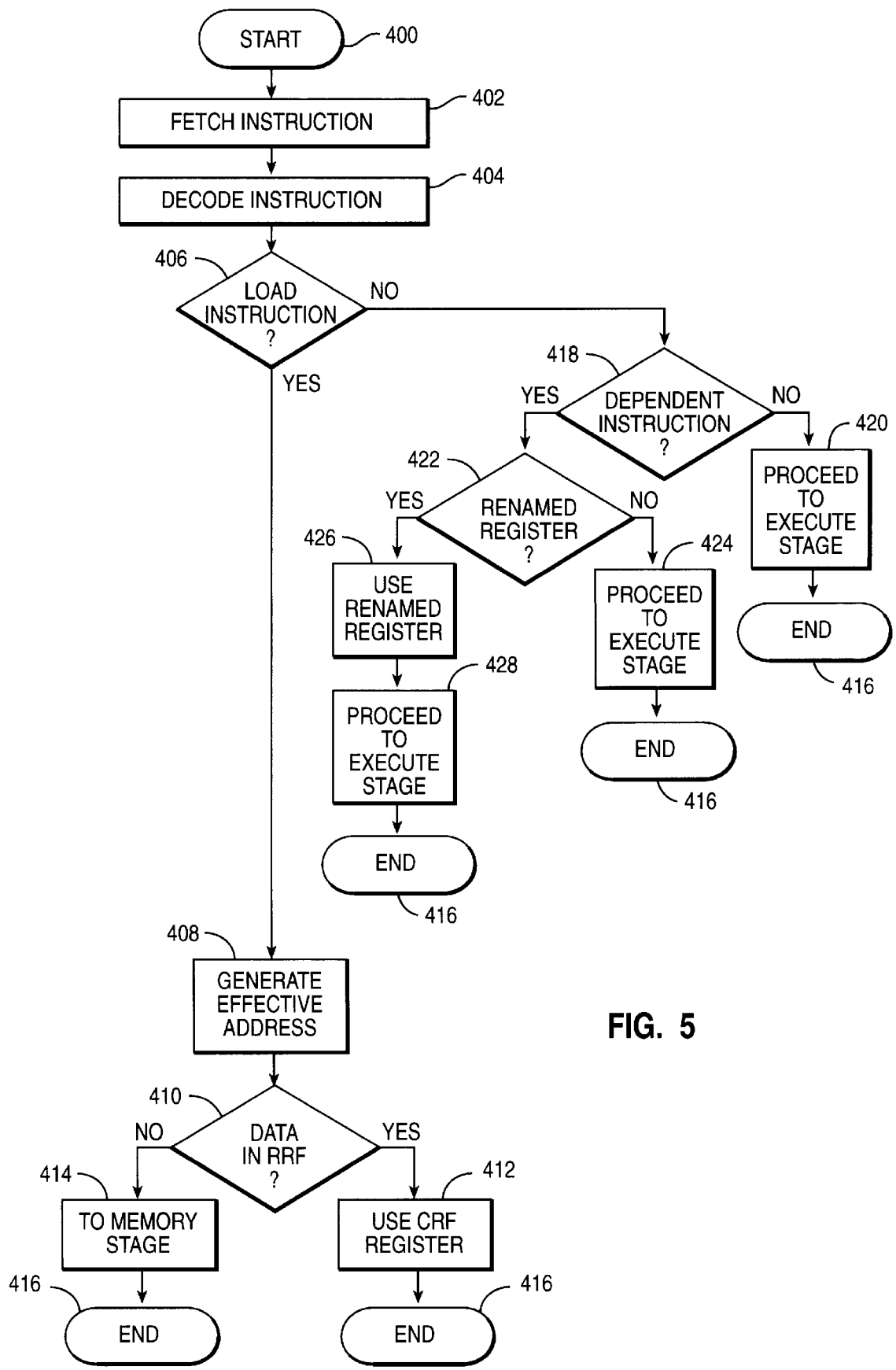
FIG. 5 is a flow chart illustrating the processing of instructions by the pipeline configuration of FIG. 4 using the CPU of FIG. 3 according to the teachings of the present invention.

Reference now being made to FIG. 5, a flow chart is shown illustrating the processing of instructions by the pipeline configuration 502 of FIG. 4 using the CPU 50 of FIG. 3 according to the teachings of the present invention. The process begins at step 400 and proceeds to step 402 where an instruction is fetched (IF 502a). Thereafter, the process proceeds to step 404 where the fetched instruction is DEcoded (DE) 502b. The process then proceeds to step 406 where it is determined whether or not the DEcoded instruction is a load instruction.

If, at step 406, it is determined that the DEcoded instruction is a load instruction, then the process proceeds to step 408. If, however, at step 406, it is determined that the DEcoded instruction is not a load instruction, then the process proceeds to step 418. At step 408, the effective address is generated for the load instruction, and the process proceeds to step 410. At step 410, it is determined whether or not the required data is stored within a register of the RRF 304. The determination is made as previously described in connection with the Register Number Unit 312.

If, at step 410, it is determined that the required data does not reside within the RRF 304, then the process proceeds to step 414. If, however, at step 410 it is determined that the required data resides within the RRF 304, then the process proceeds to step 412. At step 414, the process proceeds to the memory stage 502d, and thereafter, the process proceeds to end at step 416. At step 412, the load instruction is renamed to the RRF 304 register containing the required data, and the process proceeds to end at step 416.

At step 418, it is determined whether or not the DEcoded instruction has a register dependency with a previously executed load instruction. Register dependency, as used hereinafter, refers to a subsequent instruction that has a dependency upon the value of a prior load instruction via the register containing the data.

If at step 418, it is determined that the DEcoded instruction has a register dependency, then the process proceeds to step 422. If, however, at step 418, it is determined that the DEcoded instruction does not have a register dependency, then the process proceeds to step 420. At step 420, the process proceeds to the execute stage (502c), and thereafter, the process proceeds to end at step 416. At step 422, it is determined whether or not a renamed register is identified for the dependent instruction. If, at step 422, it is determined that a rename register exist, then the process proceeds to step 426. If, however, at step 422, it is determined that a rename register does not exist, then the process proceeds to step 424. At step 424, the process proceeds to the execute stage (502c), and thereafter, the proceeds to end at step 416. At step 426, the renamed register is assigned to the instruction, and the process proceeds to the execute stage(502c) at step 428. Thereafter, the process proceeds to end at step 416.

Figure 6:
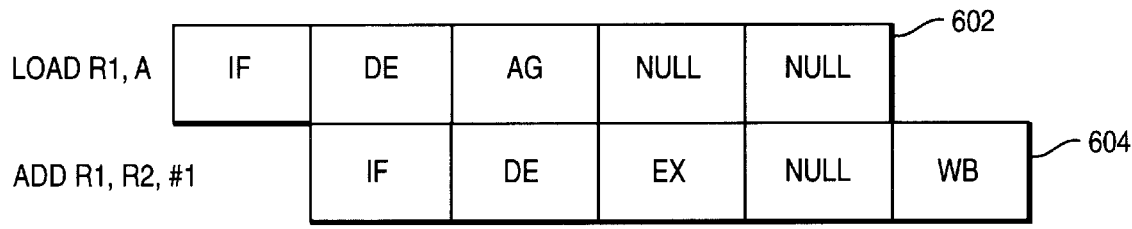
FIG. 6 is a block diagram illustrating an example of the pipeline configuration of FIG. 5 as executed according to the teachings of the present invention.

Reference now being made to FIG. 6, a block diagram is shown illustrating an example of the pipeline configuration 502 of FIG. 5 as executed according to the teachings of the present invention. A load instruction "Load R1, A" and a subsequent add instruction "Add R1, R2, #1" that depends upon the data previously loaded have been used for this example. Pipeline configurations 602 and 604 represent the execution of the load and add instructions, respectively. It is assumed that the data "A" has already been loaded into selected registers of the RRF 304 by the execution of a previous load instruction.

The processing of the load instruction begins by the fetching thereof (step 402). Thereafter, the instruction is decoded (step 404). Since this is a load instruction, the effective address is generated (step 408), and used to locate the RRF 304 register containing the "A" data (step 410). The destination register of the load instruction "R1" is renamed to the RRF 304 register containing the required data (step 412).

As shown in FIG. 6, after the fetching of the load instruction is complete, the add instruction is fetched (step 402) and decoded (step 404). As previously noted, the add instruction has a register dependency on the previous load instruction via "R1" (step 418). Consequently, the dependent register is renamed to the renamed register (i.e. the RRF register, step 426), and the processing of the add instruction proceeds to the Execute (EX) stage (step 428).

Figure 7:
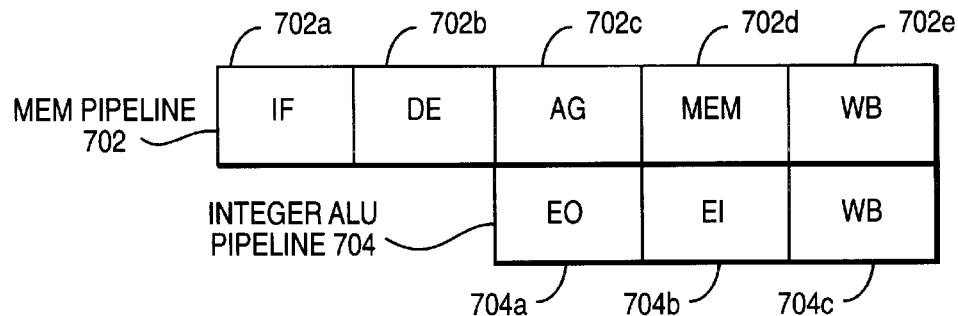
FIG. 7 is a block diagram illustrating an example of the present invention as contemplated within a 3-way superscalar processor pipeline.

The present invention can be applied to many different types of data processing systems including superscalar. Reference now being made to FIG. 7, a block diagram is shown illustrating an example of the present invention as contemplated within a 3-way superscalar processor pipeline. The memory pipeline 702 includes Instruction Fetch (IF) 702a, DEcode (DE) 702b, Address Generation and RRF 304 look up (AG) 702c, Memory Access (MEM) 702d, and Write Back (WB) 702e stages. The above noted stages were discussed in connection with FIGS. 4–6, and therefore, further discussion is redundant. The integer ALU Pipeline 704 includes a first ALU unit 704a, a second ALU unit 704b, and a Write Back (WB) 704c stage.

The ALU unit 704a and 704b can be used in a cascaded fashion such that two interlocked ALU instructions which were fetched in the same cycle can be executed one after the other in the integer pipeline 704.

In such a pipeline configuration as illustrated in FIG. 7, during each cycle the Instruction Fetch 702a stage fetches several instructions and places them on the dispatch stack. The Decode 702b stage decodes three instructions each cycle, and dispatches a triplet of independent instructions consisting of a memory and two ALU instructions. Table III below lists all possible instruction sequence combinations for the noted pipeline configuration that can be interlocked due to the dependence on the load instruction.

TABLE III

| 1. | ld,  | <alu, | alu     |
|----|------|-------|---------|
| 2. | ld,  | alu,  | <<alu   |
| 3. | ld,  | <alu, | <<alu   |
| 4. | ld,  | <alu, | <alu    |
| 5. | ld,  | <alu, | <</<alu |
| 6. | alu, | ld,   | <alu    |
| 7. | alu, | <ld,  | <alu    |

The above noted table reads from left to right and the designation "<" is used to indicate that the instruction on the right is dependent upon the result of instruction on the left. The designation "<<" is used to indicate that the instruction on the right is dependent on the second instruction on the left. In example, the fifth sequence (5)of instructions ld, <alu, <</<alu the first alu instruction depends on the load instruction and the second alu instruction depends on both the first alu instruction as well as the load instruction.

By using the RRF 304 as explained in connection with FIGS. 5–6 only instruction sequence 7 will result in a stall in the pipeline. However, this stall results due to the address generation interlock between the first alu instruction and the load instruction and not because of the load dependency. Without the use of the present invention, the above noted sequence of instructions would result in load-use interlocks causing only one to a maximum of two instructions to be executed during each cycle.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. A data processing system comprising:
   a communication bus for transmitting data;
   input means, coupled to the communication bus, for receiving input from a user;
   display means, coupled to the communication bus, for displaying information to the user;
   memory, coupled to the communication bus, for storing data; and
   a central processing unit including:
     an internal cache for storing data retrieved from the memory;
     a register file having a plurality of registers for manipulating data via instructions;
     a rename register file having a plurality of registers;
     an instruction processing unit for processing the instructions; and
   segmenting means for segmenting the rename registers into sets each corresponding to a predetermined amount of data previously accessed from the cache via a load instruction.

2. The data processing system of claim 1 wherein the segmenting means includes:
   a register number unit having:
     a plurality of entries each of which represents one of the sets of rename registers; and
     means, associated with each one of the entries, for indicating whether the represented set is being used for storing previously accessed data from the cache via a load instruction.

3. The data processing system of claim 2 wherein the instruction processing unit includes:
   means for determining, during the processing of load instruction, that the required data resides within one of the rename registers; and
   means for retrieving the data from the rename register having the required data.

4. The data processing system of claim 3 wherein the instruction processing unit includes:
   means for determining, during the processing of an instruction subsequent to the load instruction, that the required data resides in one of the rename registers, the subsequent instruction having a target register and a source register;
   means for substituting the source register with the rename register having the required data.

5. A method of reducing the number of cycles required to implement a load instruction in a data processing system having a central processing unit and a cache, the central processing unit including a rename register file having a plurality of rename registers, the method comprising the steps of:
   loading, in response to executing a first load instruction, data into the rename register file from the cache;
   executing a second load instruction having a source register;
   determining, during the execution of the second load instruction, that the requested data resides in one of the rename registers; and
   substituting the source register with the rename register containing the requested data.

6. The method of claim 5 further comprising the steps of:
   executing an instruction subsequent to the second load instruction, the subsequent instruction having a dependency upon the data loaded by the second load instruction, the subsequent instruction having a source register; and
   substituting the source register of the subsequent instruction with the substituted rename register.

* * * * *